United States Patent [19]

Fujii et al.

[11] Patent Number: 5,041,259
[45] Date of Patent: Aug. 20, 1991

[54] METHOD FOR PRODUCING FILLER-CONTAINING COLORED THERMOPLASTIC RESIN COMPOSITION

[75] Inventors: Takeshi Fujii; Tatsuyuki Mitsuno, both of Chiba; Shinichi Hori, Osaka; Katsuyasu Fukuda, Nara; Yukio Kurioka, Hyogo, all of Japan

[73] Assignees: Sumitomo Chemical Co., Ltd.; Sumika Color Co., Ltd., both of Osaka, Japan

[21] Appl. No.: 421,093

[22] Filed: Oct. 13, 1989

[30] Foreign Application Priority Data

Oct. 15, 1988 [JP] Japan .................................. 63-260299

[51] Int. Cl.$^5$ .............................................. B29B 7/90
[52] U.S. Cl. ...................... 264/349; 264/141; 264/211; 264/211.23; 425/204
[58] Field of Search .................... 264/349, 211, 211.23, 264/141; 425/204, 205

[56] References Cited

U.S. PATENT DOCUMENTS

| | | | |
|---|---|---|---|
| 3,030,330 | 4/1962 | Cines et al. | 264/349 |
| 3,353,974 | 11/1967 | Trimble et al. | 264/349 |
| 3,507,951 | 4/1970 | Morecroft et al. | 264/349 |
| 4,113,822 | 9/1978 | Takiura et al. | 264/211.23 |
| 4,153,659 | 5/1979 | Recktenwald et al. | 264/85 |
| 4,454,092 | 6/1984 | Shimizu et al. | 264/211 |
| 4,528,155 | 7/1985 | Elder | 264/211 |
| 4,657,499 | 4/1987 | Lewellen et al. | 425/204 |
| 4,663,103 | 5/1987 | McCullough et al. | 425/204 |
| 4,684,488 | 8/1987 | Rudolph | 425/204 |
| 4,895,688 | 1/1990 | Shigetani et al. | 264/171 |

FOREIGN PATENT DOCUMENTS 59-108050  6/1984  Japan .

*Primary Examiner*—Jeffery Thurlow
*Attorney, Agent, or Firm*—Cushman, Darby & Cushman

[57] ABSTRACT

The present invention provides a novel method for producing a filler-containing colored thermoplastic resin composition superior in pigment dispersibility and impact resistance. This method includes melt kneading firstly at least a part of components of resin consisting of a thermoplastic resin (A) and/or a thermoplastic resin composition (B) with fillers (C), adding remainder of the resin, if any, with a pigment (E), and then further carrying out continuous melt-kneading.

16 Claims, No Drawings

METHOD FOR PRODUCING FILLER-CONTAINING COLORED THERMOPLASTIC RESIN COMPOSITION

BACKGROUND OF THE INVENTION

The present invention relates to a method for producing a novel colored resin composition which has superior pigment dispersibility and impact resistance and which can be utilized as shaped articles, sheets and films made by injection molding or extrusion molding, the composition comprising a thermoplastic resin composition to which pigment is incorporated.

As coloring agents for filler-containing colored thermoplastic resin compositions, there are generally used unprocessed pigments or processed pigments in which metallic soaps such as zinc stearate and magnesium stearate or dispersion mediums such as wax and fatty acid are blended with unprocessed pigments Usually, pigments processed or not and fillers are added together to thermoplastic resins and the mixture is melt kneaded by extruders, Banbury mixers, kneaders or the like, thereby to improve properties such as heat resistance, rigidity, flame retardance, dimensional stability, printability, coatability and adhesion.

However, in the case of unprocessed pigments, high-performance kneading machines such as twin-screw extruders and Banbury mixers are required and besides color development is unstable In the case of simultaneous blending of processed pigments, fillers and thermoplastic resins, dispersion medium for the pigment are adsorbed to the fillers at the melt kneading step and no good dispersion of pigments is attained even by high-performance kneading machines such as twin-screw extruders and Banbury mixers. Such poor dispersion of pigments results in reduction of color density, uneven coloration and deterioration of properties and value of products is extremely lowered.

A conventional method for production of a filler-containing colored thermoplastic resin composition comprises simultaneously and uniformly mixing all of thermoplastic resins or thermoplastic resin compositions, fillers and pigments, melt kneading the mixture by melt kneading apparatuses such as extruders, Banbury mixers or kneaders and pelletizing. However, in the case where pigments are dry colored or master powder, this method has problems that the fillers are adsorbed to dispersion medium for the pigments at the melt kneading step and pigment agglomerate is produced, thereby reduction of color density, deterioration of gloss and decrease of impact strength are brought about owing to poor pigment dispersion.

An approach to solve the problem is made by carrying out simultaneous melt kneading in the same manner as above using a pigment master batch comprising dry colored or master powder and a thermoplastic resin used as a carrier resin, thereby to pelletize the master batch. According to this method, an improvement of pigment dispersibility is recognized, but the products are insufficient in heat resistance and impact resistance in the field of industrial parts which require high level in these properties. Furthermore, there are economical problems in that use of pigment master batch brings about increase in cost.

SUMMARY OF THE INVENTION

An object of the present invention is to provide a method for producing a filler-containing colored thermoplastic resin composition superior in pigment dispersion and improved in appearance such as smoothness and colorization and impact resistance by using a melt kneading apparatus.

The filler-containing colored thermoplastic resin composition of the present invention is suitable for use in the fields of industrial parts such as automobiles and appliance parts which require heat resistance and impact resistance of high level.

DESCRIPTION OF THE INVENTION

The present invention relates to a method for producing a filler-containing colored thermoplastic resin composition (F) which comprises melt kneading a filler (C) with at least a part of components of resin consisting of a thermoplastic resin (A) and/or a thermoplastic resin composition (B), adding remainder of the resin, if any, with a pigment (E) to the mixture, and then further carrying out continuous melt kneading. Alternatively, it provides a method for producing a filler-containing &thermoplastic resin composition (F) which comprises melt-kneading a filler (C) with at least a part of a thermoplastic resin (A) and/or at least a part of one of compositions of a thermoplastic resin composition (B), solidifying the mixture to prepare a filler master batch (C), and then melt-kneading a mixture of the master batch (C), the remainder of (A) and/or (B), if any, and the pigment (E).

The thermoplastic resin (A) is a crystalline polypropylene. It includes (1) homopolymer of propylene, (2) block copolymer obtained by polymerizing propylene at the first step and copolymerizing ethylene and α-olefin such as propylene or butene-1 at the second step and (3) random copolymer obtained by polymerizing propylene at the first step and copolymerizing propylene and α-olefin such as ethylene or butene-1.

The polypropylene in the present filler-containing colored thermoplastic resin composition which is used for articles which require heat resistance and rigidity, is preferably a homopolymer of propylene or a highly crystalline polypropylene such as the block copolymer wherein a homopolymer portion which is the first segment polymerized at the first step has an isotactic pentad fraction of boiling heptane-insoluble portion of 0.970 or more, a boiling heptane-soluble content of 5.0% by weight or less and a 20° C. xylene-soluble content of 2.0% by weight or less. The polypropylene in the present filler-containing colored thermoplastic resin composition which is used for articles which require impact resistance, is preferably a propylene block copolymer which comprises homopolymer portion of propylene which is polymerized at the first step and a polymer of ethylene and α-olefin such as propylene or butene-1 polymerized at the second step.

The thermoplastic resin composition (B) is a composition comprising the above-mentioned polypropylene and ethylene-propylene copolymer rubber (H). In place of the rubber (H), ethylene-propylene-non-conjugated diene copolymer rubber (I) or ethylene-butene-1 copolymer rubber (J) may be used.

The ethylene-propylene copolymer rubber (H) has an ethylene content of 15–85% by weight, preferably 40–80% by weight. That is, highly crystalline copolymer having an ethylene content of higher that 85% by weight is difficult to process under usual rubber molding conditions and that of lower than 15% by weight in ethylene content has increased glass transition temperature (Tg) and loses rubber-like properties. This is not preferred. Number-average molecular weight of ethylene-propylene copolymer rubber is preferably such that it can be kneaded in an extruder, namely, 10,000–100,000. If the molecular weight is too small, handling for feeding to extruder is difficult and if it is too large, flowability is small and processing is difficult.

For ethylene-propylene-non-conjugated diene copolymer rubber, it preferred that non-conjugated diene content in raw material rubber is 3% by weight or less. If non-conjugated diene content is more than 3% by weight, gelation occurs at kneading and this is not preferred Ethylene-butene-1 copolymer rubber has an ethylene content of 15–85% by weight, preferably 40–80% by weight Mixing ratio of polypropylene/ethylene-butene-1 copolymer rubber is 55/44–99/1 in weight ratio.

Filler (C) used in the present invention includes, for example, inorganic fillers such as talc, calcium carbonate, mica, barium sulfate, and clay, glass fibers and carbon fibers When improvement in rigidity and heat resistance of the composition of the present invention is aimed at, it is preferred to use inorganic fillers such as talc, mica and calcium carbonate, glass fibers and carbon fibers as filler (C).

Filler-containing thermoplastic resin composition (D) is a composition comprising polypropylene (A), ethylene-propylene copolymer rubber (H) or ethylene-propylene-non-conjugated diene copolymer rubber (I) and filler (C). Alternatively, the (D) is a composition comprising polypropylene (A) and filler (C). It is desired to have a melt flow rate of at least 5 g/10 min, preferably at least 10 g/10 min.

This filler-containing thermoplastic resin composition (D) can be produced by melt kneading of the components using extruders, Banbury mixers, kneaders and the like.

Pigment (E) used in the present invention is a processed pigment comprising an unprocessed pigment mixed with a dispersion medium. Example of unprocessed pigments includes organic pigments such as polyazo pigments, quinacridone pigments, phthalocyanine pigments, and perillene.perinone pigments, inorganic pigments such as titanium oxide ultramarine and iron oxide and carbon black These pigments are so insufficient in dispersion and coloration stability that processed pigments as exemplified below are used. One of the processed pigments is, a dry colored product obtained by high speed mixing by Henschel mixer of the unprocessed pigment and a metallic salt of higher fatty acid ~uch as stearic acid or lauric acid as a dispersion medium. Another processed pigment is master powder obtained by melt kneading the unprocessed pigment and polyethylene wax prepared by heat decomposition of polyethylene under suitable conditions or by polymerizing ethylene under suitable conditions as a dispersion medium by melt kneading apparatuses such as extruders, Banbury mixers, kneaders and roll mills The other processed pigment is master powder obtained by melt-kneading the unprocessed pigment and polypropylene wax prepared by heat decomposition of polypropylene under suitable conditions or by polymerizing propylene under suitable conditions as a dispersion medium by melt-kneading apparatuses such as extruders, Banbury mixers, kneaders and roll mills. The other processed pigment is master batch obtained by melt-kneading the above dry colored or master powder together with a thermoplastic resin such as polyethylene or polypropylene as a carrier resin by a melt-kneading apparatuses such as extruders, Banbury mixers and kneaders.

The filler-containing colored thermoplastic resin composition (F) of the present invention is a composition comprising the polypropylene, the filler and the pigment explained above. Alternatively, the composition (F) is a composition comprising the polypropylene, the ethylene-propylene copolymer rubber (H) or the ethylene-propylene-non-conjugated diene copolymer rubber (I), fillers (C) and the pigments.

As kneading apparatuses, there may be used melt-kneading apparatuses such as extruders, Banbury mixers and kneaders, but preferred is extruders and more preferred is twin-screw extruders in that continuous production is possible and separate feeding is possible.

Kneading is effected, for example, by previously homogeneously mixing polypropylene (A) or (8) a mixture of polypropylene and one of rubbers selected from ethylene-propylene copolymer rubber (H), ethylene-propylene-non-conjugated diene copolymer rubber (I) and ethylene-butene-1 copolymer rubber (J) with filler (C), melt-kneading the mixture by a melt-kneading apparatus and further adding pigments (E) to the resulting melt and carrying out continuous kneading. Alternatively, the kneading is carried out by previously homogeneously mixing at least a part of polypropylene (A), and/or at least a part of one of components of (B) selected from polypropylene, ethylene-propylene copolymer rubber (H), ethylene-propylene-non-conjugated diene copolymer rubber (I) and ethylene-butene-1 copolymer rubber (J) and the whole of filler (C), melt-kneading and pelletizing the mixture by a melt-kneading apparatus to obtain a filler master batch (G), homogeneously mixing this filler master batch (G) with the remainder of polypropylene (A) and/or the remainder of components of (B), i.e., polypropylene, ethylene-propylene copolymer rubber, ethylene-propylene-non-conjugated diene copolymer rubber or ethylene-butene-1 copolymer rubber, if any, and pigments (E) and melt-kneading the mixture by a melt-kneading apparatus.

By melting or pelletizing the filler with the thermoplastic resin or thermoplastic resin composition, the filler is uniformly dispersed therein and furthermore, the filler surface is coated with the thermoplastic resin or thermplastic resin composition and thus agglomerate of pigment is not produced but a filler-containing colored thermoplastic resin composition superior in pigment dispersion can be obtained.

The present invention is specifically explained by the following examples.

In the examples, measuring methods of properties are as follows.

(1) Dispersibility

A plate-like test piece of 3 mm thick was pressed under 120 atm., at 230° C. for 3 minutes into a thin film sheet and then particle diameters of pigment and filler were observed by a polarizing optical microscope at 50× magnification, whereby dispersibility was evaluated.

Dispersibility was determined from maximum particle diameter in terms of circle of pigment particles in the field of the polarizing optical microscope according to the following criteria.

| Grade | | |
|---|---|---|
| 5 | maximum particle diameter | 10μ or less |

-continued

| Grade | | |
|---|---|---|
| 4 | " | 10–30μ |
| 3 | " | 30–50μ |
| 2 | " | 50–100μ |
| 1 | " | greater than 100μ |

(2) Falling weight impact test (FWI)

Measurement was conducted according to the method specified in JIS-K722 at 23° C.

The plate-like test piece used above was prepared by drying the composition at 120° C. for 2 hours by a hot-air drier and then injection molding the composition by an injection molding machine IS150E-V manufactured by Toshiba Machine Co., Ltd. at a molding temperature of 220° C. and a mold temperature of 50° C. for an injection time of 15 sec. and cooling time of 30 sec.

(3) Conditions for production of composition

The composition was prepared under the following conditions unless otherwise notified.

Respective components of given amounts were weighed and homogeneously premixed by Henschel mixer and then the mixture was extruded by a continuous twin-screw extruder (TEX 44 SS 30BW-2V manufactured by Japan Steel Works, Co. Ltd.) at an extrusion amount of 30 kg/hr, a resin temperature of 220° C. and a screw speed of 350 rpm under suction by vent. Screws comprising three flight type rotors and kneading discs were provided at two positions in a kneading zone, i.e., the one in a zone next to the first opening and the other in a feed opening, respectively.

Examples 1–3 and Comparative Examples 1–3

Thermoplastic resin A: Polypropylene (NOBLEN AX574, Sumitomo Chemical Co., Ltd.);

Thermplastic resin composition (B): Polypropylene (NOBLEN, Sumitomo Chemical Co., Ltd.)/ethylene-propylene copolymer rubber (ESPRENE E120P, Sumitomo Chemical Co., Ltd.) (40/5 by weight);

Filler (C): Talc (MICRONWHITE 5000S, Hayashi Kasei);

Pigments: Carbon black (BLACKPEARL 800, Cabot Co.) dispersed in magnesium stearate (Sakai Kakagu), polyethylene wax (AC WAX, Allied Chemical Corp.) or polypropylene wax (HOECHST WAX PP-230, Hoechst AG.) (1:1 by weight), respectively. High speed mixers such as Henschel mixer were used for dispersion in magnesium stearate and kneader mixers such as rolls were used for dispersion in polyethylene wax or polypropylene wax, and then the dispersions were pulverized.

The above (A), (B) and (C) were mixed at a ratio of 35/45/20 (by weight), fed from the first feed opening and melt-kneaded under given kneading conditions with feeding the pigment (1.75 parts by weight every 100 parts by weight of the total of (A), (B) and (C)) from the second feeding opening to obtain the present filler-containing colored thermoplastic resin composition.

As comparative examples, the same raw materials and the same pigment as above were homogeneously mixed at the same ratios as above and the mixture was fed from the first feed opening and melt-kneaded under the given kneading conditions to obtain compositions.

The resulting compositions were molded into test pieces under the given injection molding conditions and were evaluated by the given evaluation methods. The results of evaluation are shown in Tables 1 and 2.

In Examples 1–3 of the present invention where the pigment was separately fed, no agglomeration of talc and pigment occurs and dispersibility and falling weight impact strength were much improved than Comparative Examples 1–3 where the raw materials and pigments were simultaneously fed and melt-kneaded.

Examples 4–6

The same raw materials as used in Examples 1–3 were weighed at the same mixing ratio as in Examples 1–3 and these raw materials other than pigment were melt-kneaded under the given melt-kneading conditions to obtain pellets.

This filler master batch composition was homogeneously mixed with the pigment used in Examples 1–3 and the mixture was melt-kneaded under the given kneading conditions to obtain compositions. The resulting compositions were evaluated in the same manner as in Examples 1–3.

By using a master batch of filler prepared with polypropylene and ethylene-propylene copolymer rubber, no agglomeration of talc and pigment occurred but dispersibility and FWI value were at practically usable level.

Examples 7–8 and Comparative Examples 4–5

Compositions were prepared in the same manner as in Examples 1–2 and Comparative Examples 1–2 for Examples 7–8 and Comparative Examples 4–5, respectively except that phthalocyanine blue (CYANINE BLUE GH manufactured by Sumitomo Chemical Co., Ltd.) was used as pigment and these compositions were evaluated. The results of evaluation are shown in Tables 1 and 2.

Remarkable improvement was also attained with phthalocyanine blue like carbon black. Thus, by using the method of the present invention for production of filler-containing colored thermoplastic resin composition, agglomeration of filler and pigment is reduced, dispersibility of pigment is improved and increase of color density and remarkable improvement of impact resistance become possible.

Examples 9–12 and Comparative Example 6

60 Parts by weight of polypropylene (NOBLEN AX574) and 20 parts by weight of polypropylene (NOBLEN Z101A manufactured by Sumitomo Chemical Co., Ltd.) as thermoplastic resin (A) and 20 parts by weight of talc (MICRONWHITE 5000S manufactured by Hayashi Kasei Co.) as filler (C) were used.

Pigments were prepared using the same raw materials and by the same method as used in Examples 1–3.

The above thermoplastic resin (A) and filler (C) were homogeneously mixed at the given ratio and fed from the first feed opening and melt-kneaded under the given kneading conditions. Pigment (1.75 parts by weight every 100 parts by weight of the mixture of (A) and (C)) was fed from the second feed opening and was melt-kneaded to obtain the filler-containing colored thermoplastic resin composition of the present invention.

Separately, the same thermoplastic resin (A) and filler (C) as above were melt-kneaded at the same mixing ratio as above under the given kneading conditions to obtain a pelletized filler master batch (G). The given amount of pigment (E) was homogeneously mixed with the master batch (G) and the mixture was further melt-kneaded under the given kneading conditions to obtain a composition.

As Comparative Example 6, the same raw materials as above including the pigment were homogeneously mixed at the same mixing ratio as above and a composition was prepared in the same manner.

The resulting compositions were molded and evaluated in the same manner as in Examples 1-3. The results are shown in Tables 1 and 2.

According to the method for production of filler-containing colored thermoplastic resin composition of the present invention, where pigment is fed separately from other components as in Examples 9-11 or a filler master batch is previously prepared and then is compounded with pigment as in Example 12, agglomeration of talc and pigment can be prevented and dispersibility and falling weight impact strength can be markedly improved as compared with the method of Comparative Example 6 where the raw materials are all simultaneously mixed and melt-kneaded.

Example 13

A filler-containing colored thermoplastic resin composition having the same composition as of Example 2 was prepared as follows.

Thermoplastic resin (A) and a filler (C) were melt-kneaded at the ratio of 35/20 by weight under the given kneading conditions to prepare a pelletized filler master batch (G) to which given amounts of a thermoplastic resin composition (B) and pigment (E) were uniformly mixed. The mixture was further melt-kneaded under the given conditions.

A composition obtained was molded and evaluated in the same manner as in Examples 1-3. The results are shown in Table 1.

Preparation of a master batch from a filler and a part of thermoplastic resin and/or a thermoplastic resin composition prevents from formation of agglomeration of talc and pigment and greatly improves dispersibility and falling weight impact strength of the resultant composition, compared with Comparative Example 2 where all of the elements are melt-kneaded at one time.

Example 14

A filler-containing colored thermoplastic resin composition having the same composition as of Example 10 was prepared as follows.

A part of thermoplastic resin (A), i.e., NOBLEN AX574, and a filler (C) were melt-kneaded with a ratio of 30/20 by weight under the given kneading conditions to prepare a pelletized filler master batch to which given amounts of remainder of the thermoplastic resin (A), i.e., NOBLEN AX574 and Z101A, and pigment (E) were uniformly mixed. Further melt-kneading was effected under the given conditions. A composition obtained was molded and evaluated in the same manner as in Examples 1-3. The results are shown in Table 1.

Preparation of a master batch from a part of thermoplastic resin and a filler causes no agglomeration of talc and pigment and improves dispersibility and falling weight impact strength of the resultant composition, compared with Comparative Example 6 where all of the elements were melt-kneaded at one time.

TABLE 1

| | | Examples | | | |
|---|---|---|---|---|---|
| | | Pigment | | Evaluation | |
| No. | Method for production | Kind of pigment | Dispersion medium | Dispersibility | FWI (kg cm) |
| 1 | Separate feeding | Cabon black | Magnesium stearate | 4 | 240 |
| 2 | " | " | Polyethylene wax | 5 | 260 |
| 3 | " | " | Polypropylene wax | 5 | 250 |
| 4 | Filler MB* | " | Magnesium stearate | 5 | 260 |
| 5 | " | " | Polyethylene wax | 5 | 270 |
| 6 | " | " | Polypropylene wax | 5 | 260 |
| 7 | Separate fedding | Phthalocyanine Blue | Magnesium stearate | 4 | 240 |
| 8 | " | " | Polyethylene wax | 5 | 260 |
| 9 | Separate feeding | Carbon black | Magnesium stearate | 4 | 120 |
| 10 | " | " | Polyethylene wax | 5 | 140 |
| 11 | " | " | Polypropylene wax | 5 | 120 |
| 12 | Filler MB* | " | Polyethylene wax | 5 | 150 |
| 13 | " | " | " | 5 | 250 |
| 14 | " | " | " | 5 | 130 |

*Filler master batch

TABLE 2

| | | Comparative Examples | | | |
|---|---|---|---|---|---|
| | | Pigment | | Evaluation | |
| No. | Method for production | Kind of pigment | Dispersion medium | Dispersibility | FWI (kg cm) |
| 1 | Simultaneous feeding | Carbon black | Mangesium stearate | 1 | 110 |
| 2 | " | " | Polyethylene wax | 2 | 120 |
| 3 | " | " | Polypropylene wax | 2 | 100 |
| 4 | " | Phthalocyanine blue | Mangesium stearate | 1 | 120 |
| 5 | " | " | Polyethylene wax | 2 | 140 |
| 6 | " | Carbon black | " | 2 | 80 |

According to the method of the present invention, dispersibility of pigment is markedly improved and conspicuous effects are exhibited in increase of color density of the composition and balance of properties, especially in improvement of impact resistance.

The resin composition provided by the present invention can be easily processed into shaped articles by molding methods usually employed for thermoplastic resin such as injection molding and extrusion molding and can be used for industrial parts which require heat resistance and impact resistance of high level such as automobile parts and appliance parts.

We claim:

1. A method for the continuous production of a filler-containing colored thermoplastic resin composition (F) which comprises the steps of:
   (i) melt-kneading a filler (C) with at least one component selected from the group consisting of polypropylene (A) and a thermoplastic resin composition (B), whereby the at least one component coats the surface of filler (C), said thermoplastic resin (B) consisting essentially of polypropylene (A) and ethylene-propylene copolymer rubber (H), ethylene-propylene-non-conjugated diene copolymer rubber (I) or ethylene-butene-1 copolymer rubber (J); and
   (ii) adding a processed pigment (E) to the coated filler of step (i) to obtain a mixture, said processed pigment comprising an unprocessed pigment mixed with a dispersion medium; and
   (iii) thereafter carrying out continuous melt-kneading of the mixture obtained in step (ii).

2. A method according to claim 1 wherein the thermoplastic resin composition (D) has a melt flow rate of at least 5 g/10 min.

3. A method according to claim 1 wherein the filler (C) is an inorganic filler selected from the group consisting of talc, mica and calcium carbonate.

4. A method according to claim 1 wherein the pigment (E) is a processed pigment comprising an unprocessed pigment and a metallic salt of a fatty acid as a dispersion medium.

5. A method according to claim 1 wherein the pigment (E) is a processed pigment comprising an unprocessed pigment and a polyethylene wax as a dispersion medium.

6. A method according to claim 1 wherein the pigment (E) is a processed pigment comprising an unprocessed pigment and a polypropylene wax as a dispersion medium.

7. A method according to claim 1 wherein the pigment (E) is an organic pigment selected from the group consisting of polyazo red and phthalocyanine blue, an inorganic pigment selected from the group consisting of titanium oxide, red oxide carbon black, or a mixture thereof.

8. A method according to claim 1, wherein the pigment (E) is added together with at least one component selected from the group consisting of polypropylene (A) and the thermoplastic resin composition (B).

9. A method for the continuous production of a filler-containing colored thermoplastic resin composition (F) which comprises the steps of:
   (i) melt-kneading a filler (C) with at least one component selected from the group consisting of polypropylene (A) and a thermoplastic resin composition (B), whereby the at least one component coats the surface of filler (C), said thermoplastic resin (B) consisting essentially of polypropylene (A) and ethylene-propylene copolymer rubber (H), ethylene-propylene-non-conjugated diene copolymer rubber (I) or ethylene-butene-1 copolymer rubber (J); and
   (ii) solidifying the mixture of step (i) to form a filler master batch (G); and
   (iii) melt-kneading said filler master batch (G) with a processed pigment (E).

10. A method according to claim 9 wherein the thermoplastic resin composition (D) has a melt flow rate of at least 5 g/10 min.

11. A method according to claim 9 wherein the filler (C) is an inorganic filler selected from the group consisting of talc, mica and calcium carbonate.

12. A method according to claim 9 wherein the pigment (E) is a processed pigment comprising an unprocessed pigment and a metallic salt of a fatty acid as a dispersion medium.

13. A method according to claim 9 wherein the pigment (E) is a processed pigment comprising an unprocessed pigment and a polyethylene wax as a dispersion medium.

14. A method according to claim 9 wherein the pigment (E) is a processed pigment comprising an unprocessed pigment and a polypropylene wax as a dispersion medium.

15. A method according to claim 9 wherein the pigment (E) is an organic pigment selected from the group consisting of polyazo red and phthalocyanine blue, an inorganic pigment selected from the group consisting of titanium oxide, red oxide carbon black, or a mixture thereof.

16. A method according to claim 9, wherein the filler master batch (G) is melt-kneaded in step (iii) with a processed pigment (E) together with one component selected from polypropylene (A) and the thermoplastic resin composition (B).

* * * * *